Sept. 13, 1927. F. V. SJOLANDER 1,642,630
REEL ATTACHMENT FOR AUTOMOBILE WHEELS
Filed March 3, 1927
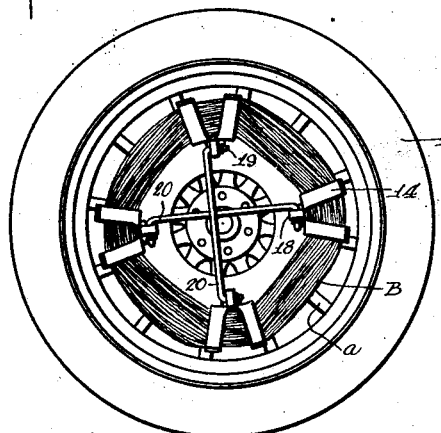
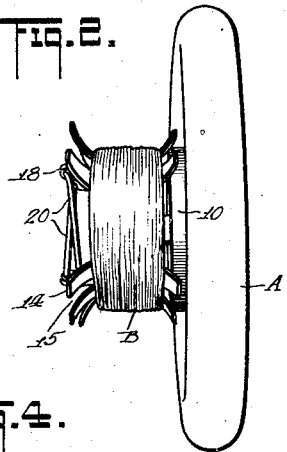
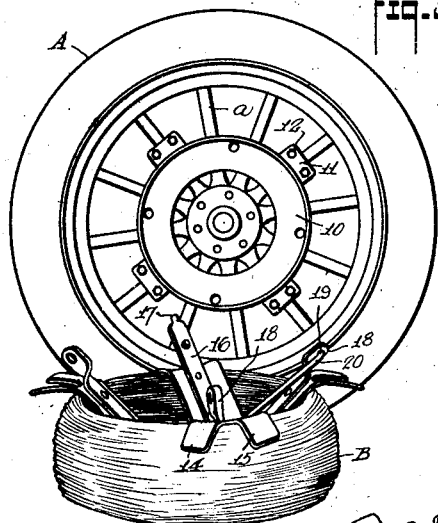
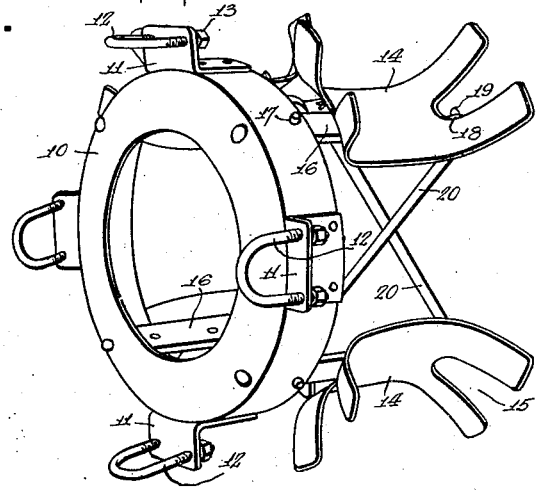
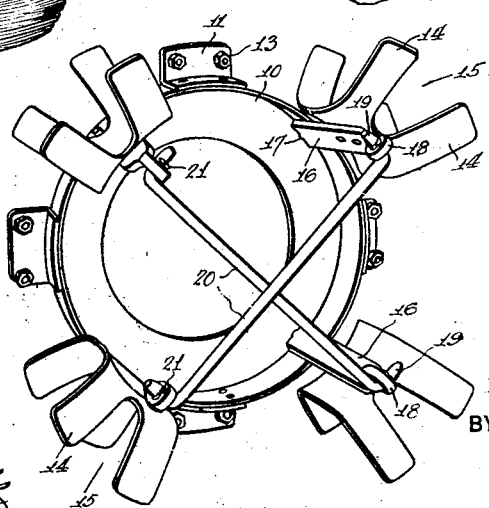
INVENTOR
Frank V. Sjolander.
BY
ATTORNEY Patented Sept. 13, 1927.

1,642,630

UNITED STATES PATENT OFFICE.

FRANK V. SJOLANDER, OF JAMESTOWN, KANSAS.

REEL ATTACHMENT FOR AUTOMOBILE WHEELS.

Application filed March 3, 1927. Serial No. 172,433.

My invention relates to an attachment that may be applied to an automobile wheel and forming a reel on which a measurable quantity of telephone wire, as much as a mile in length, for instance, may be wound.

The general object of my invention is to provide a reel attachment that may be applied to a wheel. A rear wheel, for instance, is jacked up and caused to be turned, and the reel will wind up the wire.

A further object of the invention is to provide a collapsible reel which can readily be brought to a knocked down form to disengage the coil of wire.

The manner and means whereby the above and other objects are attained will clearly appear as the description proceeds.

Reference is to be had to the accompanying drawings forming a part of this specification, it being understood that the drawings are merely illustrative of one example of the invention.

Figure 1 is a front elevation of a reel attachment made in accordance with my invention and showing the same applied to an automobile wheel.

Figure 2 is an edge view of the reel and automobile wheel shown in Figure 1.

Figure 3 is a view partly in perspective and partly in side elevation showing the base of the reel applied to the automobile wheel and with the drum sections of the reel and their appurtenances in knocked down form, showing the coil of wire disengaged from the reel.

Figure 4 is a perspective view of the reel attachment including the base thereof and before being applied to the wheel.

Figure 5 is a perspective view of the reel without the wheel, the view being taken at the opposite side from Figure 4.

In carrying out my invention in accordance with the illustrated example, an annular reel base 10 is provided having laterally projected members 11, here shown as formed of angle brackets secured to said base. The members 11 receive U-bolts 12 for securing the base 10 to the spokes "$a$" for example of an automobile wheel "A", said U-bolts having nuts 13.

The base 10 carries at one side drum sections 14 on which a coil of wire "B" may be reeled. On each drum section 14 is an arm 16 formed with a hooked terminal 17 adapted to be engaged in one of a plurality of holes in the periphery of the base 10. The outer side of each drum section 14 has a cutout 15 in practice.

On each arm 16 at the outer end is a lug or ear 18 to receive a hooked end 19 of cross braces 20 for stiffening the drum sections 14. The hooked terminals 19 of the braces 20 are in practice held by cotter pins 21.

With the described construction the base 10 is secured through the medium of the U-bolts 12 to the hind wheel such as "A" of an automobile.

The arms 16 of the drum sections 14 and the braces 20 stiffen the drum sections and maintain the same in an annular series constituting the reel proper on which the wire "B" is coiled. With the wheel "A" to which the reel is applied, jacked up, the wheel may be caused to turn by operation of the motor of the automobile for winding the wire into a coil as "B." By removing the cotter pins 21 and knocking out two of the hooked ends 19, the drum portion of the reel will collapse as shown in Figure 3, leaving the coil "B" intact and ready for handling. Thus the coil of wire is removed from the reel leaving the base 10 on the wheel, where it may be left permanently or as long as it may be desired.

I would state furthermore that while the illustrated example constitutes a practical embodiment of my invention, I do not limit myself strictly to the exact details herein illustrated, since, manifestly, the same can be considerably varied without departure from the spirit of the invention, as defined in the appended claims.

What I claim is:

1. A reel attachment for automobile wheels including a base, means to secure said base to a wheel, and separate drum sections, said drum sections having means to detachably engage said base; together with crossing brace elements connecting said drum sections.

2. A reel attachment for automobile wheels including a base, means to secure said base to a wheel, and separate drum sections, said drum sections having means to detachably engage said base; together with cross-braces detachably engageable with the respective drum sections to connect and stiffen the same.

FRANK V. SJOLANDER.